Feb. 25, 1941.   M. KLAVIK   2,233,316
BODY FOR MOTOR VEHICLES
Filed Feb. 7, 1938
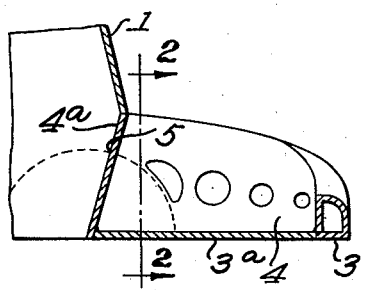
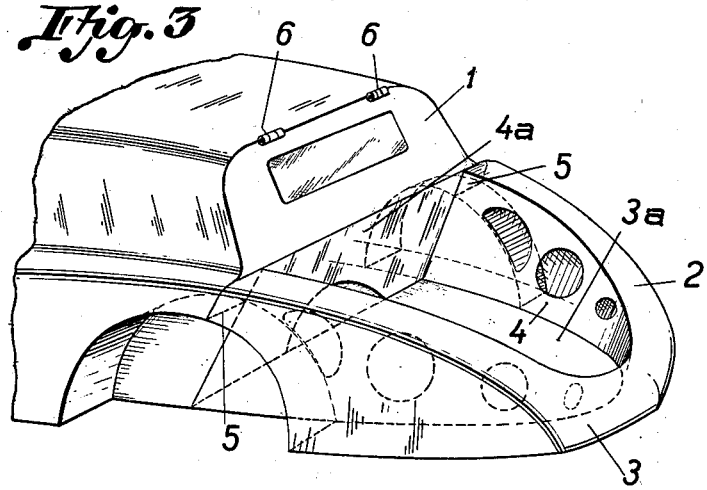
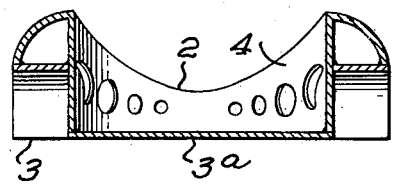
INVENTOR
M. Klavik.
By Lacey & Lacey,
Attys Patented Feb. 25, 1941

2,233,316

UNITED STATES PATENT OFFICE 2,233,316

BODY FOR MOTOR VEHICLES

Miloš Klavík, Koprivnice, Czechoslovakia

Application February 7, 1938, Serial No. 189,243
In Czechoslovakia February 6, 1937

1 Claim. (Cl. 180—1)

(Granted under the provisions of sec. 14, act of
March 2, 1927; 357 O. G. 5)

The invention relates to the rear of the bodies of motor vehicles, in particular for aerodynamically designed vehicles with the motor at the rear.

Hitherto the rear part of such vehicle bodies has been undetachably connected with the central body section and the stays and longitudinal bearers extended into the rear part surrounding the motor.

According to the invention, this rear part is made of metal plate as an independent hollow body and is fixed to the actual body only in the range of two points, e. g., over the rear wheels.

This hollow body has sufficient strength to retain its shape even under great stresses. It should be understood that, in the event that the hollow body is damaged, it may be readily replaced on the vehicle body proper. On the other hand, should the vehicle body proper be damaged, the hollow body may be removed and placed on another vehicle.

Figure 1 is a longitudinal sectional view of the construction.

Figure 2 is a vertical sectional view.

Figure 3 is a perspective view.

On to the actual body 1 of the vehicle is connected at the rear the hollow semi-circular extension body 2 closed underneath by a curved bottom wall 3 and consisting of metal plate. Its internal space is limited laterally by a metal plate side or inner wall 4 which, as shown, may if necessary and for the purpose of reducing the weight, be provided with openings. The fastening of this hollow added part on to the actual vehicle body 1 may substantially take place only at two points 5 above the vehicle wheels.

The space enclosed by the hollow body serves in the case of cars with rear motors for mounting the motor installation is closed at the bottom by a plate 3a. Towards the front the enclosed space is preferably shut off by a front wall 4a. This wall is common to the vehicle body and to the hollow body.

The connection between the added part and the centre part of the vehicle body may consist of bolts, but preferably a welded connection may be used which does not place any great difficulties in the way of the removal and the replacement of the added part. In this connection, it is to be noted that a removal in general has only to be carried out when damage by a collision makes this necessary.

In consequence of its small weight, the hollow body may be made sufficiently self-supporting so that it is not deformed under working stresses. To lessen the weight, the motor cover suspended in the hinges 6 on the vehicle body 1 may be transferred on to the vehicle body itself.

I claim:

In combination with a motor vehicle body, a semi-circular extension body having a front wall and a curved side wall, said front wall being common with the vehicle body and said front and side walls defining a motor receiving space, a bottom wall closing the motor receiving space, said side wall comprising spaced wall elements, and a curved bottom wall extending between the spaced wall elements about the extension body for closing the extension body at its lower side.

MILOŠ KLAVÍK.